United States Patent [19]

Sebek et al.

[11] 3,730,839

[45] May 1, 1973

[54] PROCESS FOR PREPARING NOVENAMINE

[75] Inventors: Oldrich K. Sebek; Herman Hoeksema, both of Kalamazoo, Mich.

[73] Assignee: The Upjohn Company, Kalamazoo, Mich.

[22] Filed: Dec. 13, 1971

[21] Appl. No.: 207,580

Related U.S. Application Data

[63] Continuation-in-part of Ser. No. 829,757, June 2, 1969, Pat. No. 3,652,536.

[52] U.S. Cl. ........................195/29, 195/66, 195/96
[51] Int. Cl. ..............................................C12d 13/02
[58] Field of Search ........................195/29, 96, 51 R; 260/210 R, 210 N

[56] References Cited

OTHER PUBLICATIONS

A. M. Rutenburg et al. New England Journal of Medicine, Vol. 259 No. 10 pp. 469–473

*Primary Examiner*—Alvin E. Tanenholtz
*Assistant Examiner*—Thomas S. Wiseman
*Attorney*—Roman Saliwanchik et al.

[57] ABSTRACT

Novel process for enzymatic cleavage of 3-acylamino-4-hydroxy coumarins such as are found in some antibiotic substances. Process yields amine compounds having antibiotic properties per se and/or utility as intermediates to make antibiotically active substances. Examples of compounds which can be used as starting materials in the subject process and their amine cleavage products are as follows:

Novobiocin → novenamine

Dihydronovobiocin → novenamine

Isonovobiocin → isonovenamine

Descarbamoyl novobiocin → descarbamoyl novenamine

Descarbamoyl dihydronovobiocin → descarbamoyl novenamine

18 Claims, No Drawings

PROCESS FOR PREPARING NOVENAMINE

CROSS REFERENCE TO RELATED APPLICATION

This application is a continuation-in-part of pending application Ser. No. 829,757, filed on June 2, 1969 now U.S. Pat. No. 3,652,536.

BRIEF SUMMARY OF THE INVENTION

This invention relates to a novel process for enzymatically cleaving 3-acylamino-4-hydroxy coumarins such as are found in some antibiotic substances, for example, in the antibiotic novobiocin. The enzymatic cleavage of the amide bond in the antibiotic novobiocin yields 3-amino-4-hydroxy-7-0-[3-0-carbamoyl-4-0-methyl-5-deoxy-5,5-dimethyl-$\beta$-L-lyx-opyranosyl]methyl coumarin, which has been given the trivial name novenamine. Novenamine also can be obtained by the enzymatic cleavage of dihydronovobiocin. Further, the subject enzymatic process can be used to make isonovenamine from isonovobiocin; descarbamoyl novenamine from descarbamoyl novobiocin or descarbamoyl dihydronovobiocin.

Novobiocin is an antibiotic obtainable as an elaboration product of a novobiocin-producing streptomycete. Methods for the production, recovery, and purification of novobiocin are described in U.S. Pat. No. 3,049,534.

Dihydronovobiocin is an antibiotic prepared by hydrogenating novobiocin according to the procedures disclosed in U.S. Pat. No. 3,175,944.

Descarbamoyl novobiocin and descarbamoyl dihydronovobiocin can be prepared according to the procedures disclosed in U.S. Pat. No. 2,938,899.

Isonovobiocin can be prepared according to the procedures disclosed in J.A.C.S. 79, 5,321-5,322 (1957).

Prior to the subject invention, those in the antibiotic art have not been able to cleave the novobiocin molecule in a manner to yield the compound called novenamine. Thus, the applicants' process for enzymatic cleavage of novobiocin to yield novenamine is the first known process for accomplishing such a result and is the first known enzymatic process for cleaving 3-acylamino-4-hydroxy coumarins such as are found in novobiocin.

DETAILED DESCRIPTION

Novenamine (U-33,918) is prepared by enzymatic cleavage of novobiocin or dihydronovobiocin with microorganisms which have been identified as Arthrobacter sp., N-18, and bacterium N-41. It was discovered that these bacteria elaborate an enzyme which cleaves novobiocin into novenamine and 4-hydroxy-3-(3-methyl-2-butenyl)-benzoic acid. This enzymatic hydrolytic cleavage is accomplished under anaerobic conditions and gives quantitative yields of the cleavage products.

A. THE MICROORGANISMS

1. Description

The bacteria used according to this invention for the enzymatic cleavage of novobiocin have been identified as an Arthrobacter sp., for purposes of this application referred to as N-18, and as bacterium N-41, hereinafter referred to as N-41. N-18 and N-41 are new bacteria. One of their strain characteristics is the ability to elaborate an enzyme which cleaves novobiocin. Subcultures of the living organisms were deposited and can be obtained from the permanent collection of the Northern Utilization and Research Div., Agricultural Research, U.S. Dept. of Agriculture, Peoria, Ill., U.S.A. Their accession numbers in this repository are NRRL B-3652 and NRRL B-5340, respectively.

The bacterium N-18 is a non-motile, pleomorphic, gram-negative bacterium of variable length, sometimes of coccoid appearance. It grows well in a variety of laboratory media containing various carbon and nitrogen sources, for example, peptone, casein digests, lactalbumin digests, tryptone, trypticase, and the like. With the exception of methionine and valine, N-18 utilizes all the common amino acids as carbon and nitrogen source for growth, for example, aspartate, glutamate, lysine, arginine, histidine, proline, hydroxyproline, asparagine, glutamine, glycine, alanine, leucine, isoleucine, serine, threonine, tyrosine, phenylalanine, and tryptophan. It also utilizes novobiocin in the same manner. The following compounds also can serve as carbon source for growth: ribose, xylose, glucose, fructose, galactose, gluconate, 2-ketogluconate, p-hydroxybenzoate, citrate, and glycerol, but not arabinose, sorbose, maltose, sucrose, lactose, dextrin, starch, rhamnose, raffinose, inositol, sorbitol, mannitol, or p-aminobenzoate. Ammonium salts serve as adequate nitrogen sources for growth. The bacterium N-18 grows well aerobically at 20°, 28°, 32°, and 37°C., but not at 42° or 5°C. It is catalase-positive, but the cytochrome oxidase, indole, Voges-Proskauer and urease tests are negative. It does not reduce nitrate to nitrite, does not liquefy gelatin, and does not produce $H_2S$. Tests for arginine, lysine, and ornithine decarboxylases are negative. The bacterium forms acids from sugars without gas evolution. It is on the basis of the above data that this bacterium has been designated as belonging to the genus Arthrobacter.

The bacterium N-41 differs from N-18 mainly in that it can use only a limited number of non-nitrogenous compounds for growth. It does not grow on glucose, fructose, galactose, sorbose, arabinose, ribose, xylose, disaccharides, sorbitol, mannitol and glycols. When supplemented with $NH_4+$, it utilizes gluconate, glycerol, lactate, $C_4$-dicarboxylic acids of the TCA cycle and $\alpha$-ketoglutarate, but not citrate, acetate, formate, malonate, salicylate, m-hydroxybenzoate, or phenylacetate. It utilizes certain L-amino acids of the aspartic family (aspartate, homoserine, threonine, isoleucine, lysine, asparagine), glutamate family (glutamate, proline, glutamine), pyruvate family (alanine, leucine), and $\beta$-methylaspartate, and phenylalanine. It is a non-motile gram-negative rod with uniform terminal swelling as seen by electron microscope. It reduces nitrate to nitrite, is catalase-positive but indole, cytochrome oxidase, urease, hydrogen sulfide and Voges-Proskauer negative, and produces no pigment. Gelatin is not liquefied, milk not peptonized and methylene blue is not reduced. Satisfactory growth of the microorganism is obtained at 24°-37°C.

The cytosine-guanine (CG) content of its isolated DNA is 60 percent which corresponds to the values for the taxonomically ill-defined high-percent-CG Arthrobacter-Alcaligenes group (see Antonie van Leeuwenhoek 36:193-207, 1970). On the basis of these properties (especially its inability to utilize sugars and its CG content), its taxonomic position fits best the genus Alcaligenes. A direct comparison to the authentic type strain *A. methalcaligenes* which it resembles most closely (non-motile), was also made but the two organisms differed considerably in their metabolic patterns (*A. methalcaligenes* does not cleave novobiocin.

2. Maintenance

The bacteria are maintained on slants of agar medium containing 0.5 percent tryptone, 1 Gold Label Brer Rabbit molasses, 1 percent glycerol, 0.25 percent yeast extract, and 1.5 percent agar in 1 liter distilled water stored at 5°C. and transferred in 2–4 week intervals. The bacteria also can be maintained on media of comparatively simple composition, for example, 0.2 percent Difco Casitone agar alone or supplemented with 0.1 percent glucose and 0.05% $NH_4Cl$ and inorganic salts, or 0.1 percent glucose and 0.05 percent yeast extract. Complex media, for example, brain heart infusion broth, do not contribute to the elaboration of the novobiocin-cleaving enzyme which is designated herein as novobiocin acylase. Preferably, the bacteria are stored over liquid nitrogen at about $-196°C$.

3. Growth Conditions

The cells of bacteria N-18 and N-41 can be grown and produce novobiocin acylase in a variety of media consisting of various carbon and nitrogen sources as long as good growth of the bacterium is obtained. Suitable carbon and nitrogen sources are yeast extract, NZ-Amine B (Sheffield's enzymatic digest of casein), Casitone (Difco), glycerol, $NH_4Cl$, and the like. The media can be supplemented, advantageously, with inorganic salts, for example, $KH_2PO_4$, $MgSO_4$, $NaCl$, $FeCl_3$, $FeSO_4$, and the like. A preferred medium consists of 0.8% NZ-Amine B, 0.5% $KH_2PO_4$, 0.05% $NaCl$, 0.02% $MgSO_4 \cdot 7H_2O$ and 0.001% $FeSO_4$ (pH 7.6).

The hydrolytic (enzymatic cleavage) property of the bacteria is evidenced by use of a test depending on the fact that novenamine is rapidly converted to a brown-reddish pigment when exposed to the air. If such a color develops upon incubation of a particular bacterial isolate with novobiocin, or another suitable substrate, as herein disclosed, the isolate has the desirable hydrolyzing property because novenamine is present. A reliable bacterial selection can be carried out in the following way. The culture is grown in the above liquid NZ-Amine B medium in a shaken flask overnight at room temperature. An aliquot is then serially diluted in test tubes and a loopful of each dilution is streaked on NZ-Amine B agar (composition as above) and incubated until colonies develop. A number (usually 10 to 50) of discrete and well-defined colonies are selected and each transferred with sterile toothpicks on (1) NZ-Amine B agar (of the above composition), and (2) a medium containing inorganic salts (as above) and 0.1 – 0.2 percent novobiocin (Na salt) as the only C and N source, and incubated for 2-3 days at room temperature. After that time, colonies grown on novobiocin which will form brown-reddish halos, are those which cleave novobiocin to novenamine (and which in turn was converted to the pigment) and, therefore, contains the novobiocin hydrolyzing enzyme. These colonies are then picked from the NZ-Amine B agar (instead of from novobiocin agar to minimize the inhibitory effect of the novobiocin products on the viability of the isolate), and grown again in NZ-Amine B liquid overnight, aliquots distributed in 1 ml. portions in plastic vials and stored under nitrogen. Modifications of this procedure are possible.

1. NZ-Amine B broth is seeded, incubated overnight, an aliquot of the heavily grown culture is serially diluted and the more highly diluted samples (to favor the outgrowth of separate colonies) are streaked on NZ-amine B agar supplemented with 0.1 percent novobiocin. After 2-3 days of incubation, those colonies which have the characteristic brown-reddish halos are then transferred directly as desired.

2. An isolate is grown in NZ-Amine B broth overnight, a drop of the grown culture is placed on the surface of an agar plate containing 0.1 percent novobiocin (with or without additional salts) and incubated overnight at room temperature. If the brown-reddish color develops in the area of application, novobiocin cleavage (hydrolysis) has taken place.

3. The time for this color development may be shortened to 20–120 minutes if more enzyme is supplied for the reaction. In this instance, cells from 10–50 ml. of the culture which has been grown overnight as under (2), are harvested by centrifugation and washed once with water. A small volume (0.2 – 0.5 ml.) is mixed with the same volume of 0.2 percent novobiocin. The suspension is exposed to air (air may be replaced by oxygen) and either allowed to stand or to shake at room temperature until the characteristic color is noted. The time needed for this color development depends not only on a sufficient amount of oxygen but also on the amount of enzyme supplied (the heavier the cell suspension is, the faster the pigmentation appears) but reliable reading can be made within a 20–120 minute incubation time.

B. THE ENZYMATIC CLEAVAGE OF NOVOBIOCIN

The enzymatic cleavage of novobiocin proceeds as follows:

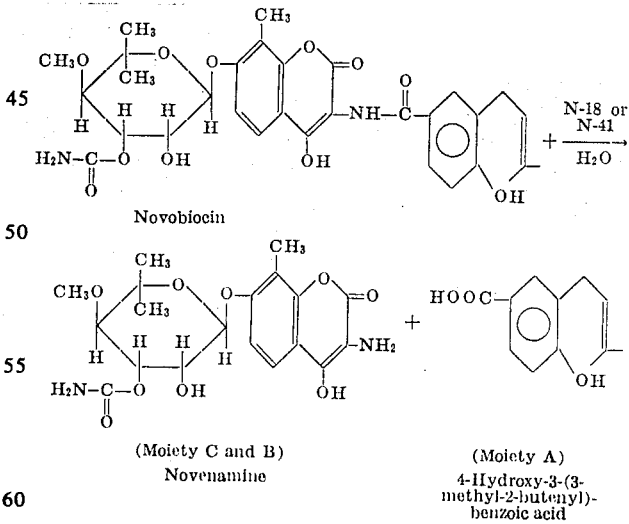

(Moiety C and B)
Novenamine (Moiety A)
4-Hydroxy-3-(3-methyl-2-butenyl)-benzoic acid The above cleavage is accomplished by contacting novobiocin, or dihydronovobiocin, as the free acid or as a base salt thereof, with the hydrolytic enzyme elaborated by bacterium N-18 or bacterium N-41, described above. This cleavage is accomplished, advantageously, under anaerobic conditions to give quantitative yields of the cleavage products.

By substituting in the above process descarbamoyl novobiocin, or isonovobiocin, for novobiocin, there is obtained descarbamoyl novenamine, and isonovenamine, respectively.

The cells of N-18 or N-41 are grown for 1 – 3 days at an incubation temperature of about 25°–37°C. The preferred growth time is about 1 day at an incubation temperature of about 28°C. Advantageously, the cells are agitated and aerated in the medium during growth.

The bacterial cells are harvested from the growth medium, advantageously, by centrifugation. The harvested cells are washed with water and resuspended, advantageously, in a minimum amount of water. This material then can be suspended in an aqueous solution of novobiocin, for example, sodium novobiocin, where the cleavage process takes place. As disclosed above, the cleavage process is conducted under anaerobic conditions. Such anaerobic conditions can be achieved in the laboratory by various means known in the art, for example, overlaying the reaction mixture with an air-impervious substance, for example, toluene, or, flushing the reaction mixture with nitrogen or other inert gas. Anaerobic conditions in processing equipment larger than laboratory size can be achieved by various methods known in the art.

Generally, the cleavage of novobiocin by the enzyme formed by bacterium N-18 or N-41 is complete in about 18–42 hours at room temperature. Higher temperatures, for example, 34°C. to about 37°C., will shorten the reaction time; whereas lower temperatures, for example 15°C. to about 24°C., will lengthen the reaction time. The cleavage is preferably conducted at room temperature. Higher concentrations of the cells (containing higher concentrations of the desired enzyme) also shorten the reaction time.

Upon completion of the cleavage process, the bacterial cells are separated from the reaction mixture. These cells of N-18 and N-41 are quite stable and not readily inactivated during the cleavage process. Thus, the same cells can be used 4 – 6 times over in cleavage processes as described above. The cells can also be lyophilized and stored for prolonged periods of time at low temperatures (preferably below freezing) but some loss of the novobiocin-cleaving ability occurs under these conditions. The cells are separated from the reaction mixture by centrifugation or filtration. Centrifugation is preferred. The amount of novenamine in the cell-free supernatant can be ascertained by the following method: An aliquot (0.1 – 0.5 ml.) of supernatant is diluted, adjusted to pH 2.0 with 3 N HCl, extracted with butyl acetate, the extract diluted with 2 volumes of acidified (3 N HCl) ethanol (pH 2.0), and the amount of novenamine quantitatively determined by its absorption at 295 m$\mu$. The amount of novenamine is calculated according to the following formula:

$(OD_{295} m\mu \times Dilution/35.4^*) = $ mg. novenamine/ml.

*35.4 equals $OD_{295} m\mu$ of 1 mg. novenamine/ml. ($=a$)
OD = Optical Density Novobiocin concentrations of from about 1 – 2.5 percent are cleaved to novenamine (and Moiety A) in yields of 91–100 percent in about 1 day by the above-described cleavage process.

Hydrolysis of novobiocin to novenamine (and 3-isopententyl-4-hydroxybenzoic acid) also has been found to be brought about by cell-free enzyme containing extracts of N-18 and/or N-41. These extracts are prepared by conventional methods. For example, a washed cell suspension is ruptured in the French pressure cell at a low temperature (4°–10°C.). The highly viscous mass which results is depolymerized by the addition (50 mg./ml.) of deoxyribonuclease I (Worthington Biochemical Corp., Freehold, N.J.), the debris and unbroken cells are centrifuged off, and the supernatant is dialyzed against 0.05 M phosphate buffer (pH 7.5) overnight at 6°C. Other methods which can be used to provide the hydrolytic enzyme in cell-free form included the lysis of the cells by lysozyme (1 mg./ml., Sigma Chemical Co., St. Louis, Mo.), and sonication (Raytheon magnetostrictive oscillator, 10 kc) for 5 – 15 minutes at 4°–10°C. As disclosed above, the hydrolysis of novobiocin has to be performed in the absence of oxygen since novenamine solution, if exposed to air, gradually darkens, a reaction typical of aromatic amines.

Dihydronovobiocin also can be substituted for novobiocin in the above-disclosed enzymatic cleavage processes to yield novenamine; descarbamoyl novobiocin can be substituted for novobiocin to yield descarbamoyl novenamine; descarbamoyl dihydronovobiocin can be substituted for novobiocin to yield descarbamoyl novenamine; and isonovobiocin can be substituted for novobiocin to yield isonovenamine.

The above-described assay procedure also can be used in general to determine the amount if isonovenamine when isonovobiocin is substituted for novobiocin in the process, and descarbamoyl novenamine when descarbamoyl novobiocin or descarbamoyl dihydronovobiocin is substituted for novobiocin in the process, although suitable changes in $a$ values, due to variations in molecular weights, will be necessary.

Novenamine is relatively soluble in water and relatively insoluble in solvents in which novobiocin and dihydronovobiocin are extractable at acid pH. For example, novenamine is relatively insoluble in chlorinated lower-alkanes, e.g., methylene chloride, chloroform, ethylene dichloride, and the like; water immiscible esters, e.g. ethyl acetate, butyl acetate, amyl acetate, and the like; and water-immiscible higher alcohols. Novenamine is unstable in the presence of oxygen in solution under alkaline conditions.

Novenamine can be recovered from the enzymatic cleavage reaction by a variety of procedures, for example, the use of adsorbents, and crystallization from solvents. The first step of any such process, advantageously, involves the removal of the bacterial cells; advantageously, this is done by centrifugation or filtrating of an acidified suspension. In a preferred process, the cleavage supernatant or filtrate containing novenamine, as well as various impurities such as some of the uncleaved starting material, i.e., novobiocin or dihydronovobiocin, is adjusted to an acidic pH of about 2 to 6, then extracted with a solvent in which novenamine is not soluble. Any of the solvents disclosed above can be used; butyl acetate is the preferred solvent. The extraction of the acidified cleavage supernatant removes unreacted substrates, for example, novobiocin or dihydronovobiocin as well as the cleaved hydroxybenzoic acid, thus leaving a supernatant which can be freeze-dried to a relatively pure preparation of novenamine acid addition salt. This preparation of novenamine can be used in environments where higher purity preparations of novenamine are not essential. Also, this relatively pure preparation of novenamine can be acylated to form antibacterially-active novenamine acylates, as hereinafter described.

Higher purity novenamine preparations can be obtained by subjecting a relatively pure preparation of novenamine, as disclosed above, to crystallization procedures from a solvent such as methanol. For example, the water in a relatively pure preparation of novenamine hydrochloride can be removed by azeotropic distillation, for example, using absolute ethanol, and novenamine then crystallized from absolute ethanol and ether to afford a purified preparation of novenamine.

Suitable acids for adjusting the pH of the cleavage supernatant, as disclosed above, are strong mineral or organic acids for example, hydrochloric, hydrobromic, phosphoric, sulfuric, formic, oxalic, and the like. Freeze-dried novenamine will be isolated as the salt of the acid used. For example, if hydrochloric acid is used to adjust the pH of the cleavage supernatant, then novenamine will be isolated as the hydrochloride salt. Novenamine is a very weak base and the salts are not very stable. This salt can be converted to the free base form of novenamine by suspending it in tetrahydrofuran and adding about one equivalent of triethylamine or by dissolving it in slightly moist acetone, or by prolonged drying under reduced pressure or by crystallization from methanol. Other salts of novenamine then can be made from the free base. Salts of novenamine can be used for the same biological purposes as the free base.

Novenamine also can be recovered from the cleavage supernatant, disclosed above, by converting the novenamine to an N-acylate. An example of such a procedure is as follows: (1) acidify cleavage supernatant to about pH 2.5 with a mineral acid, for example, hydrochloric acid, (2) extract with a solvent for novobiocin, for example, butyl acetate, (3) adjust pH to about 8.0 with a base, for example, 6 N sodium hydroxide, and (4) add a halide or anhydride of a selected carboxylic acid to form novenamine N-acylate. A nitrogen atmosphere should be maintained in the above-disclosed process once the reaction mixture is adjusted to an alkaline pH.

Mineral acids other than hydrochloric, which were disclosed previously, can be used in the above process. Also, other solvents for novobiocin, disclosed previously, can be used for butyl acetate in the above process. Bases which can be used in the above process in place of sodium hydroxide are sodium bicarbonate or sodium carbonate, lithium or potassium hydroxide, bicarbonates, or other bases or basic salts of metals. In addition water soluble tertiary amines such as trialkyl amines (triethylamine) or pyridine, quinoline and the like may be used.

Novenamine can also be recovered from aqueous solutions by adsorption on a surface active absorbent, for example, deoxygenated decolorizing carbon or decolorizing resins, and eluting the adsorbed material with a solution of water and acetone.

Isonovenamine and descarbamoyl novenamine can be recovered from enzymatic cleavage process solutions in the same manner as disclosed above or by obvious modifications thereof.

Novenamine, descarbamoyl novenamine, and isonovenamine can be acylated by the procedures disclosed in application Ser. No. 829,757 to yield compounds having antimicrobial activity.

The following examples are illustrative of the process and products of the present invention, but are not to be construed as limiting. All percentages are by weight and all solvent mixture proportions are by volume unless otherwise noted.

Example 1    Enzymatic Cleavage of Novobiocin

A loopful of the cells from a slant of bacterium N-18, NRRL B-3652, or N-41, NRRL B-5340, is inoculated into 250 ml. Erlenmeyer flasks containing 100 ml. of a medium which consists of the following ingredients: 0.8% NZ-Amine B, 0.05% $KH_2PO_4$, 0.05% NaCl, 0.02% $MgSO_4 \cdot 7H_2O$ and 0.01% $FeSO_4$, per liter deionized water, pH 6.8 – 7.8. The flasks are incubated at 28°C. on rotary shaker. After 18 hours of incubation, when the bacterial population has almost reached its maximum density, the bacterial cells are harvested by centrifugation, washed once with distilled water and resuspended in water to give a ml. final volume. One-ml. fractions are then pipetted into a series of 5 test tubes, novobiocin as the sodium salt is added, and the final volume in each test tube is adjusted to 3 ml. The tubes are flushed with nitrogen, closed tightly and incubated on a reciprocating shaker. After 20 hours of incubation at room temperature, the cells are removed by centrifugation and the cell-free supernatants are analyzed for the presence of novenamine by the procedure disclosed previously to give the following results:

| Novobiocin (initial concentration) mg./ml. | Novenamine Formed % Yields |
|---|---|
| 10 | 100 |
| 25 | 91.7 |
| 50 | 44.4 |
| 75 | 4.9 |
| 100 | 0 |

Example 2    Isolation of Novenamine Hydrochloride

A 4.5 liter portion of cell-free liquid, from a larger scale enzymatic cleavage process, as described in Example 1, containing cleavage product from 12 grams of novobiocin, is acidified with 15 ml. of 6 N hydrochloric acid and extracted once with 1 liter of methylene chloride, and once with 800 ml. of methylene chloride. The solvent extract is discarded and the aqueous material is freeze-dried; yield, 10 g. of crude novenamine powder which gives an instantaneous purple color with ninhydrin in pyridine.

An 800-mg. aliquot of the above preparation of novenamine is recrystallized from absolute ethanol, hydrogen chloride, and ether after removal of water by distillation from absolute ethanol; yield, 400 mg. of novenamine hydrochloride crystals having a melting point >300°C. dec.

A purified preparation of novenamine has the following elemental analysis:
Analysis:

Calc'd for    $C_{19}H_{25}N_3O_8Cl$:
         C, 49.49;      H, 5.47;      N, 6.08;      Cl, 7.69.

Found: C, 49.26; H, 6.61; N, 5.81.

Novenamine hydrochloride has the following strong IR bands in mineral oil mull: (in cm⁻¹)

| | |
|---|---|
| 3420 (sh = shoulder) | 1645 |
| 3350 | 1606 |
| 3190 | 1575 |
| 2920 (oil) | 1540 |
| 2860 (oil) | 1485 |
| 2650 | 1455 |
| 1707 | 1435 (oil) |
| 1375 (oil) | 1130 (sh) |
| 1340 | 1115 |
| 1265 | 1083 |
| 1255 | 1000 |
| 1210 | |

Crystallization of the above material from slightly moist methanol affords novenamine as the amphoteric free base which decomposes in the range 220°–240°C.

Example 3

By substitution of novobiocin in Examples 1 and 2 by dihydronovobiocin, descarbamoyl novobiocin, descarbamoyl dihydronovobiocin and isonovobiocin, there is obtained novenamine, descarbamoyl novenamine (from both descarbamoyl novobiocin and descarbamoyl dihydronovobiocin), and isonovenamine, respectively.

Descarbamoyl novenamine is characterized by the following structural formula:

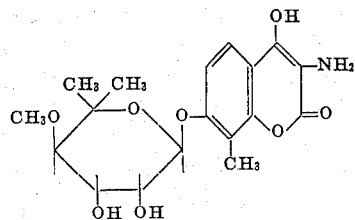

Isonovenamine is characterized by the following structural formula:

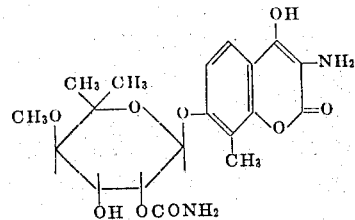

Example 4

By substituting a substantially cell-free extract of bacteria N-18 and/or N-41 for the living bacteria in Examples 1 and 3, there are obtained the enzymatic cleavage products characterized in Examples 1, 2, and 3.

We claim:

1. A process for preparing novenamine, the compound having the structural formula:

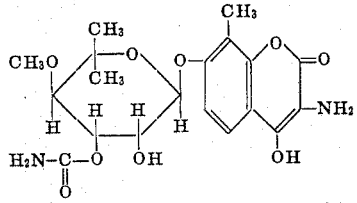

which comprises incubating novobiocin or dihydronovobiocin with an amide cleaving enzyme elaborated by a bacterium selected from the group consisting of Arthrobacter sp. N-18 NRRL B-3652, and bacterium N-41 NRRL B-5340.

2. A process for preparing novenamine, according to claim 1, wherein novobiocin is incubated with bacterium Arthrobacter sp. N-18 NRRL B-3652, under anaerobic conditions.

3. A process for preparing novenamine, according to claim 1, wherein novobiocin is incubated with bacterium N-41 NRRL B-5340, under anaerobic conditions.

4. A process for preparing isonovenamine, the compound having the structural formula:

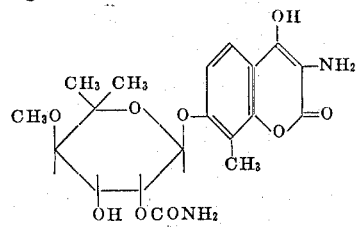

which comprises incubating isonovobiocin with an amide cleaving enzyme elaborated by a bacterium selected from the group consisting of Arthrobacter sp. N-18 NRRL b3652, and bacterium N-41 NRRL B-5340.

5. A process for preparing isonovenamine, according to claim 4, wherein isonovobiocin is incubated with bacterium Arthrobacter sp. N-18 NRRL B-3652, under anaerobic conditions.

6. A process for preparing isonovenamine, according to claim 4, wherein isonovobiocin is incubated with bacterium N-41 NRRL B-5340, under anaerobic conditions.

7. A process for preparing descarbamoyl novenamine, the compound having the structural formula:

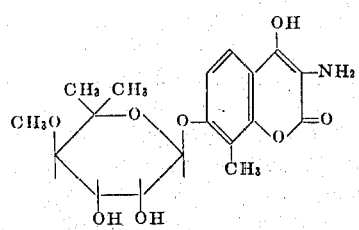

which comprises incubating descarbamoyl novobiocin or descarbamoyl dihydronovobiocin with an amide cleaving enzyme elaborated by a bacterium selected from the group consisting of Arthrobacter sp. N-18 NRRL B-3652, and bacterium N-41 NRRL B-5340.

8. A process for preparing novenamine, according to claim 1, wherein novobiocin or dihydronovobiocin is incubated with a substantially cell-free extract of a bacterium selected from the group consisting of Arthrobacter sp. N-18 NRRL B-3652, and bacterium N-41 NRRL B-5340.

9. A process for preparing novenamine, according to claim 8, which comprises incubating novobiocin or dihydronovobiocin with a substantially cell-free extract from the bacterium Arthrobacter sp. N-18 NRRL B-3652.

10. A process for preparing novenamine, according to claim 8, which comprises incubating novobiocin or dihydronovobiocin with a substantially cell-free extract from the bacterium N-41 NRRL B-5340.

11. A process for preparing isonovenamine, according to claim 4, wherein isonovobiocin is incubated with a substantially cell-free extract of a bacterium selected from the group consisting of Arthrobacter sp. N-18 NRRL B-3652, and bacterium N-41 NRRL B-5340.

12. A process for preparing isonovenamine, according to claim 11, which comprises incubating isonovobiocin with a substantially cell-free extract from the bacterium Arthrobacter sp. N-18 NRRL B-3652.

13. A process for preparing isonovenamine, according to claim 11, which comprises incubating isonovobiocin with a substantially cell-free extract from the bacterium N-41 NRRL B-5340.

14. A process for preparing descarbamoyl novenamine, according to claim 7, wherein descarbamoyl novobiocin or descarbamoyl dihydronovobiocin is incubated with a substantially cell-free extract of a bacterium selected from the group consisting of Arthrobacter sp. N-18 NRRL B-3652, and bacterium N-41 NRRL B-5340.

15. A process for preparing descarbamoyl novenamine, according to claim 14, which comprises incubating descarbamoyl novobiocin or dihydronovobiocin with a substantially cell-free extract of the bacterium Arthrobacter sp. N-18 NRRL B-3652.

16. A process for preparing descarbamoy novenamine, according to claim 14, which comprises contacting descarbamoyl novobiocin or dihydronovobiocin with a substantially cell-free extract of the bacterium N-41 NRRL B-5340.

17. A process for preparing descarbamoyl novenamine, according to claim 7, wherein descarbamoyl novobiocin or descarbamoyl dihydronovobiocin is incubated with bacterium Arthrobacter sp. N-18 NRRL B-3652, under anaerobic conditions.

18. A process for preparing descarbamoyl novenamine, according to claim 7, wherein descarbamoyl novobiocin or descarbamoyl dihydronovobiocin is incubated with bacterium N-41 NRRL B-5340, under anaerobic conditions.

* * * * *